July 14, 1953 F. B. ROBERTS 2,645,342
SIZING APPARATUS
Filed March 5, 1949 3 Sheets-Sheet 1
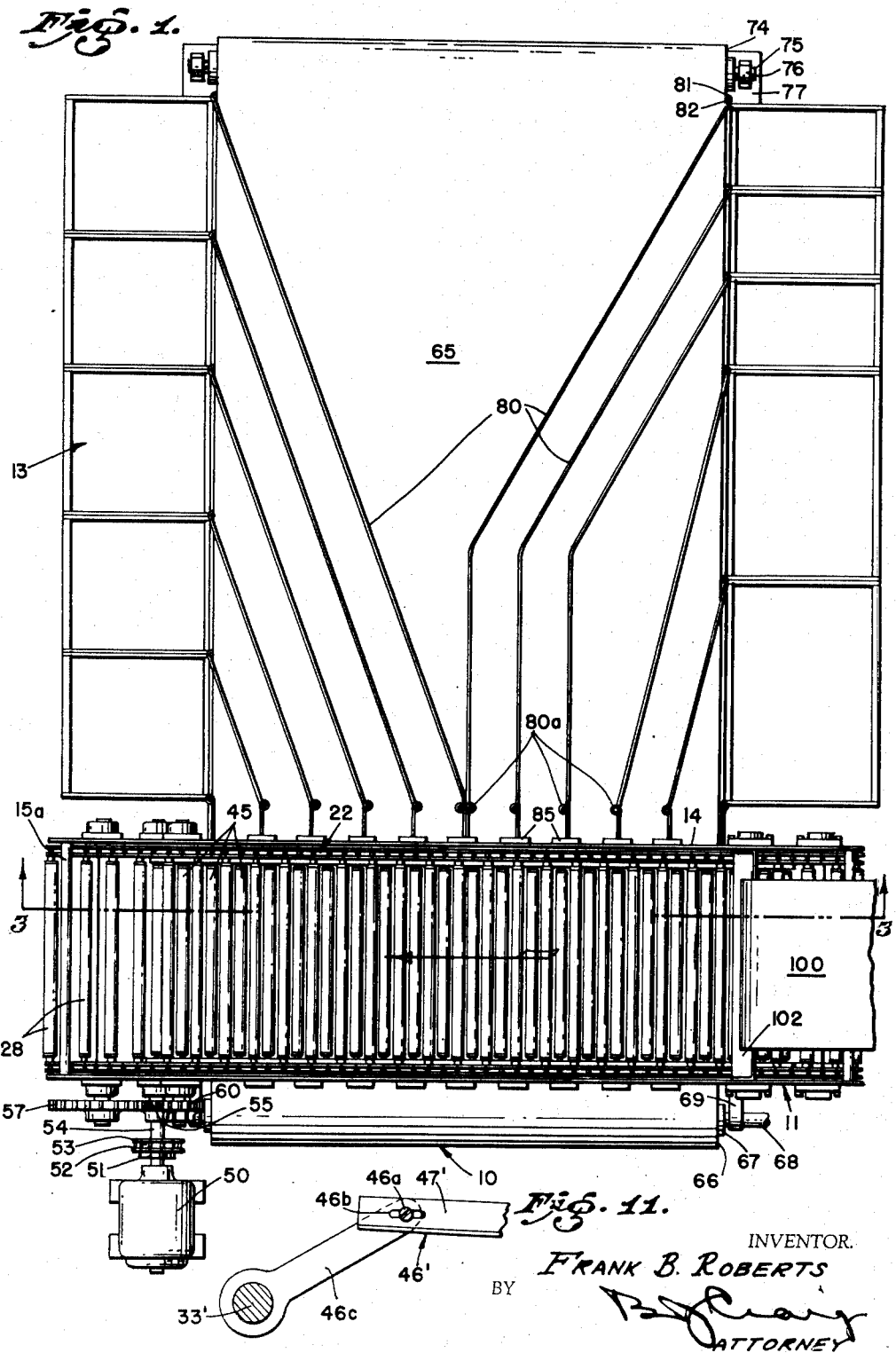
INVENTOR.
FRANK B. ROBERTS
BY
ATTORNEY July 14, 1953  F. B. ROBERTS  2,645,342
SIZING APPARATUS
Filed March 5, 1949  3 Sheets-Sheet 2
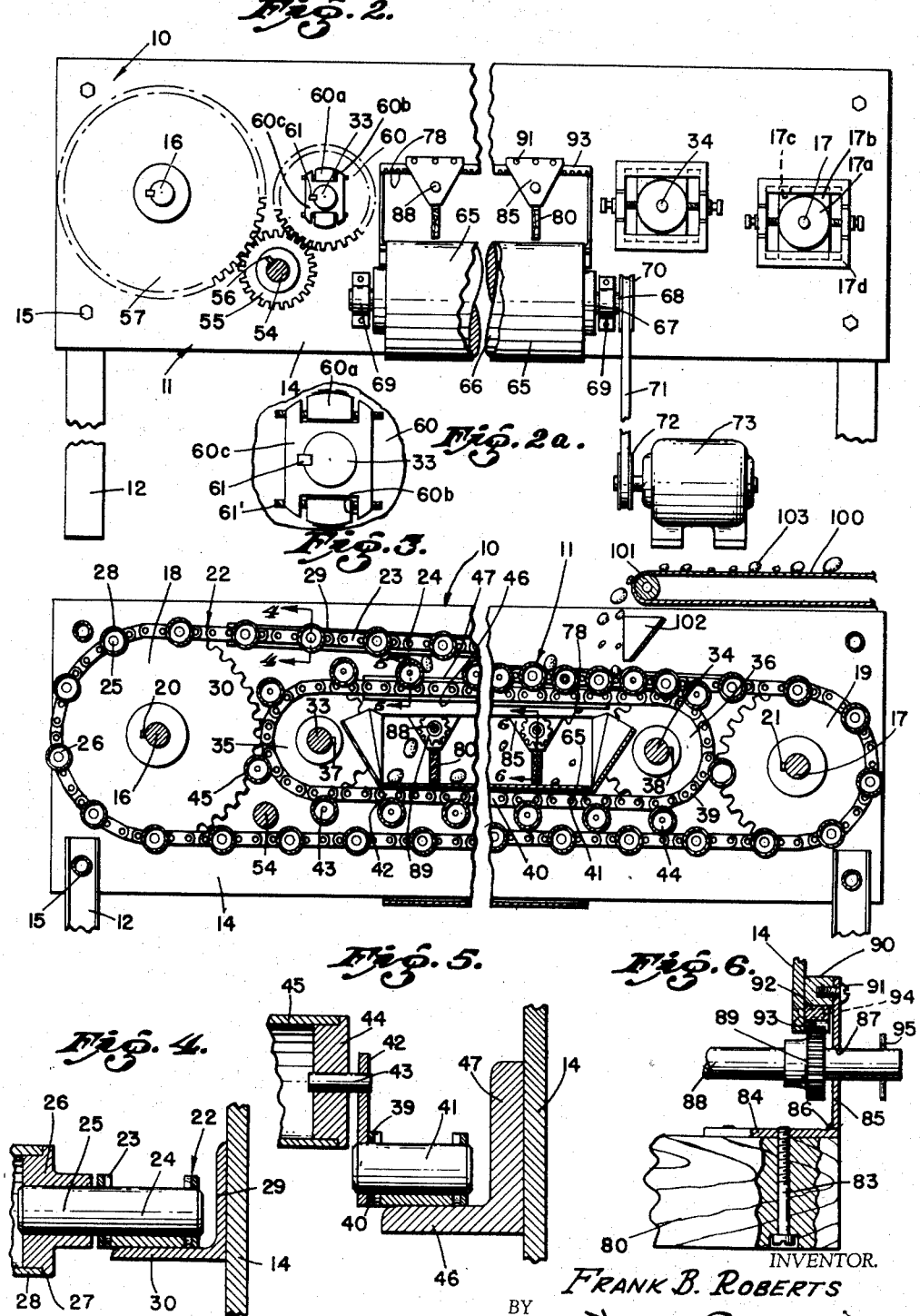
INVENTOR.
FRANK B. ROBERTS
BY
ATTORNEY July 14, 1953 F. B. ROBERTS 2,645,342
SIZING APPARATUS
Filed March 5, 1949 3 Sheets-Sheet 3
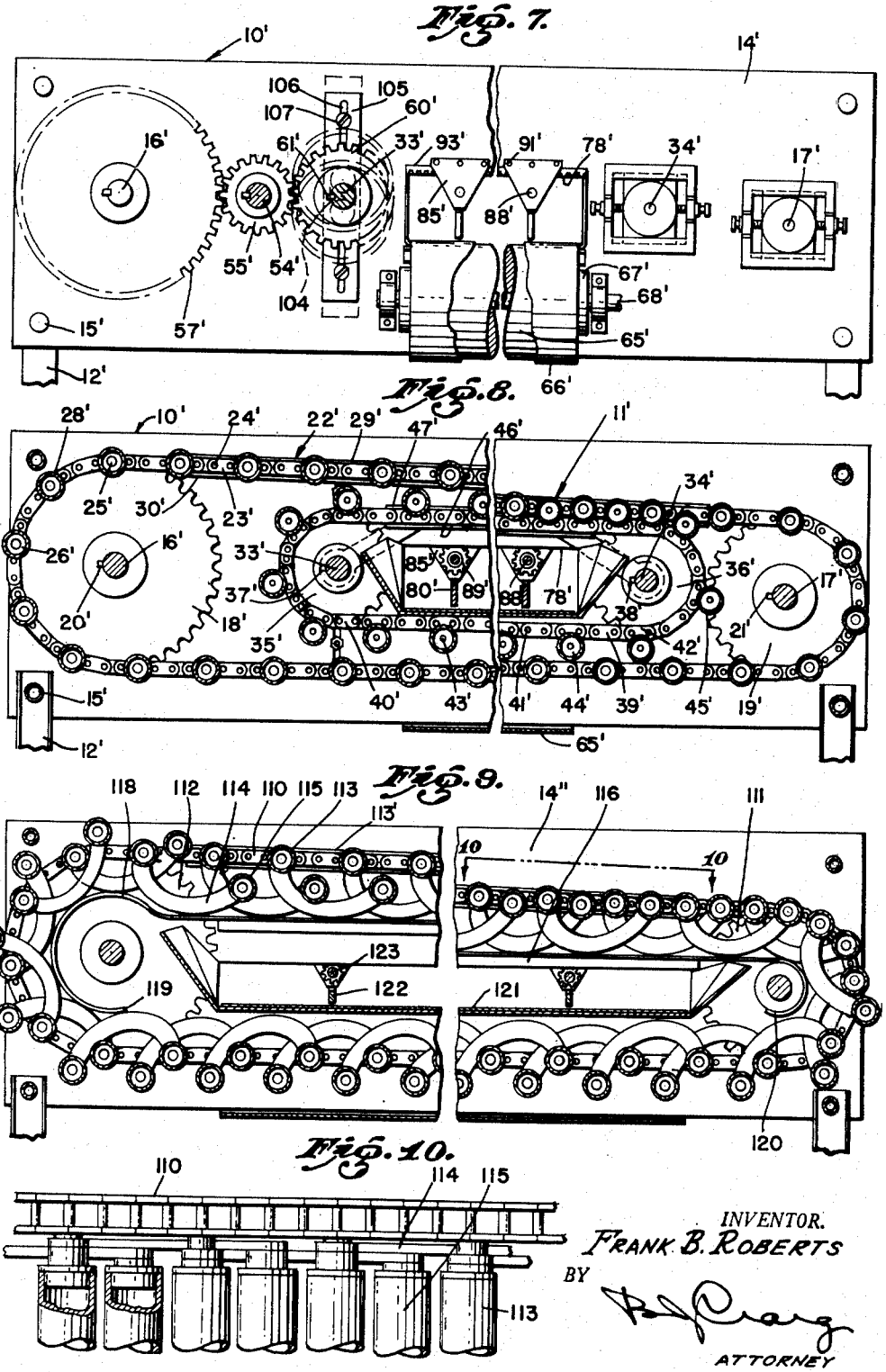
INVENTOR.
FRANK B. ROBERTS
BY
ATTORNEY Patented July 14, 1953

2,645,342

UNITED STATES PATENT OFFICE 2,645,342

SIZING APPARATUS

Frank B. Roberts, Anaheim, Calif.

Application March 5, 1949, Serial No. 79,790

6 Claims. (Cl. 209—102)

This invention relates to a sizing apparatus.

The general object of the invention is to provide an improved apparatus by means of which fruit, such as olives, may be accurately sized and discharged to bins according to the various sizes.

A more specific object of the invention is to provide an olive sizing machine including spaced roller carrying chains arranged in such a manner that as the chains advance the rollers are shifted to permit a sizing operation to be performed.

Another object of the invention is to provide an olive sizing machine including a pair of endless chain members each carrying rollers and with the rollers of one chain disposed between the rollers of the other chain and with the chains so mounted that as the rollers advance the distance between the axes of the rollers is increased so that the sizing operation may be performed.

Another object of the invention is to provide a sizing apparatus including an endless chain having spaced rollers thereon and a second endless chain disposed within the first endless chain and with rollers on the second chain movable between the rollers of the first chain and with a distance between the rollers of the two chains increasing as the chains advance so that a sizing operation may be performed.

Another object of the invention is to provide a sizing apparatus including spaced rollers and wherein novel guide means is provided to direct fruit sized between the rollers into the proper bins.

Another object of the invention is to provide a sizing apparatus including chains having rollers thereon with the rollers of one chain disposed between the rollers of the other chain and wherein novel means is provided for adjusting the position of the rollers of one chain with respect to the rollers of the other chain.

Another object of the invention is to provide a sizing apparatus including spaced rollers fixed with respect to a chain which carries the rollers and wherein other rollers are movably supported by the chain to move between the first mentioned fixed rollers to provide a sizing operation.

Other objects and advantages of my invention will be apparent from the following description taken in connection with the accompanying drawings, wherein:

Fig. 1 is a top plan view of a sizing apparatus embodying the features of my invention;

Fig. 2 is an end elevation showing the sizer;

Fig. 2a is an enlarged fragmentary elevation showing the shaft mounting;

Fig. 3 is a fragmentary section taken on line 3—3, Fig. 1;

Figs. 4, 5 and 6 are sectional detail views taken on lines 4—4, 5—5 and 6—6, respectively, Fig. 3;

Fig. 7 is a view similar to Fig. 2, showing a modification of my invention;

Fig. 8 is a view similar to Fig. 3, showing the modification of my invention;

Fig. 9 is a view similar to Fig. 3, showing a further modification of my invention;

Fig. 10 is a fragmentary top plan view taken as indicated by line 10—10, Fig. 9, and showing a further modification; and Fig. 11 is a fragmentary sectional view.

Referring to the drawing by reference characters, I have shown my invention as embodied in a sizing apparatus which is indicated generally at 10. As shown the apparatus includes a sizing member 11 arranged on standards 12 and a bin member, indicated generally at 13.

The sizing member includes a support comprising spaced vertical plates 14 which, adjacent to their lower edges, are connected to the standards 12 by fastening members 15. Spacing members 15ª connect the upper portions of the plates 14.

The plates 14 support spaced shafts 16 and 17 on which a pair of sprockets 18 and a pair of sprockets 19 are secured by keys 20 and 21. The ends of the shaft 17 are mounted in bosses 17ª on plates 17ᵇ which slide in slots 17ᶜ on frames 17ᵈ secured to the plates 14. The sprockets 18 and 19 support endless chains 22 which include link members 23 connected by pivot pins 24. Opposed pairs of pivot pins at spaced intervals are elongated inwardly as shown in Fig. 4 to provide a portion 25 which rotatably supports collars 26. The collars 26 are rabbeted as at 27 to receive rolls 28. The rolls 28 are spaced apart as shown in Fig. 3.

Beneath the top reach of the chain the plates 14 have angle irons 29 suitably secured thereto. The angle irons 29 include portions 30 which are inclined downwardly and to the right in Fig. 3, and along these portions 30 the upper reach of the chain moves during the sizing operation.

Between the shafts 16 and 17 I arrange a second pair of shafts 33 and 34, which, like the shafts 16 and 17, are supported by the plates 14.

The shafts 33 and 34 support pairs of sprockets 35 and 36, which are keyed to the shafts 33 and 34 by keys 37 and 38. The sprockets 35 and 36 support endless chains 39 which include links 40 connected by pivot pins 41. On certain of the links 40 outwardly directed opposed pairs of support arms 42 are mounted. The support arms 42 support pivot arms 43. The pivot arms 43 support collars 44, similar to the collars 26 previously described, and the collars 44 in turn support cylindrical sizing rolls 45 similar to the sizing rolls 28 previously described.

The upper reach of the chain 39 runs along the flange 46 of opposed angle members 47 which are secured to the plates 14 previously described. The portions 46 of the angles 47 are arranged at a slight angle to the portion 30 of the angles 29 so that the portions 30 and 46 diverge to the left in Fig. 3 and consequently the upper reaches of the chains diverge to the left in this figure.

The sprockets and chains are so spaced that there is no clashing between the respective chains while they are operating and the rollers 45 are so spaced that at the entrance end of the apparatus—at the right in Fig. 3—the rollers 28 and 45 are evenly spaced apart and their axes are substantially in the same plane. As the rollers advance, carried by their chains, due to the divergent angular arrangement of the path of the upper reaches of the chains, the rollers 45 gradually move below the rollers 28 as the chains move so that the space between the rollers gradually increases and this increase of space effects the sizing operation.

In order to drive the chains 22 and 39 at the proper speed, I show a motor 50 which is provided with a sprocket 51 which drives a chain 52 which in turn drives a sprocket 53 mounted on a shaft 54 carried by the plates 14. The shaft 54 has a spur gear 55 keyed thereon by a key 56 so that when the motor is operated the spur gear 55 rotates. The spur gear 55 meshes with a gear 57 mounted on the shaft and also meshes with a gear 60, which has a pair of bosses 60a thereon. These bosses 60a are arranged in slots 60b in a plate 60c which is keyed to the shaft 33 by a key 61. Opposed screws 61' on the walls of the slots engage the bosses 60a so that by tightening one pair of screws and loosening the other pair of screws the relationship of the gear 60 with respect to the shaft 33 may be altered and thus the correct positioning of the chains may be secured.

The sized fruit is discharged from between the rollers onto an endless belt 65. One end of this belt is supported on a roller 66 which has a hub portion 67 and a shaft 68 mounted in bearings 69. The bearings 69 are secured on one of the plates 14.

The shaft 67 includes a pulley 70, driven by a belt 71, driven by a pulley 72 from a motor 73. The other roller 74 in Fig. 1 includes a shaft 75 mounted in bearings 76 arranged on a support 77. The upper reach of the belt passes through slots 78 in the plates 14. When the motor is operated the roller 66 will be driven to cause the belt to advance and carry the fruit which has passed between the rollers 28 and 45 away from beneath these rollers towards the bins 13 which latter receive the respectively different sized fruit.

In order to guide the fruit to the proper bins, I provide a series of guide plates, indicated at 80. Each of these guide plates is preferably a thin strip of wood or metal and at its outer end includes a hook portion 81 which passes loosely around a security member 82 so that the guides may be angularly shifted.

As shown, the guides include angularly arranged portions and at the juncture of these angularly arranged portions I provide pivoted joints 80a so that a hinging action is provided to allow for adjustments of the guide plates, as will be hereafter described.

At their inner ends each of the guides 80 is secured by screws 83 to a horizontal plate 84. Each of the plates 84 has a pair of vertical, substantially triangular, spaced plates 85 secured thereto as by welding at 86. The opposed pairs of plates 85 are provided with holes 87 through which transverse shafts 88 extend.

At each end each shaft 88 has a gear 89 suitably fastened thereto. The plates 85 have a horizontal block 90 secured to their upper ends as by screws 91. The blocks 90 slide across the upper plane surface 92 of gear tooth racks 93. The teeth of the racks 93 are downwardly directed and engage the teeth of the gears 89. The racks 90 are secured to the plates 14 as by fastening means 94. When each shaft 88 is rotated by means of a finger engaging pin 95, the engagement of the gear with the rack will cause the gears 89 to walk along the rack, depending upon the direction in which the gear is turning. In this way the plates 85 will be moved backward and forward and as they move they will carry the guides 80 with them.

The gears 55, 57 and 60 are of such size that the upper reaches of the chains 22 and 39 run at the same speed so that the distances between the rollers remain constant at each location.

In order to feed articles to be sized to the sizing apparatus, I provide an endless conveyor 100 which at one end passes over a roller 101. The roller 101 is disposed above a baffle plate 102 supported by the plates 14. When the conveyor 100 is driven (by means not shown), the articles such as olives 103 thereon will be conveyed forwardly and discharged so that they fall lightly upon the rollers 28 and 45, and as these rollers advance and the distance between the rollers increases, the objects will be discharged between the rolls on to the conveyor belt 65 at the various predetermined locations.

In Figs. 7 and 8 I show a modification of my invention.

In the modification parts similar to those previously described are designated by single primed reference numerals. In the modification the shaft 33' is mounted at its ends in plates 105. The plates 105 are arranged along the inside of the plates 14'. The plates 105 have slots 106 receiving screws 107. By shifting the plates 105 up and down and securing them by the screws 107 in the adjusted position, the angular relation of the chain 22 to the chain 39 may be changed and thus the spacing of the rollers 28' and 45' may be varied to adjust the sizing action.

The guide plates 46' have screws 46a thereon. These screws 46a fit in slots 46b in the arms 46c carried by the shaft 33'. Upon loosening the screws 46a the arms 46c may be adjusted so that the inclination of the guide plates 46' may be varied.

In the modification the axis of the gear 55' is coplanar with the axes of the gears 57' and 60' so that the gear 55' may be shifted up and down without disengaging the teeth of the gear train. The gear 55' is driven by means of a motor similar to the manner in which the motor 50 drives the gear 55.

In Figs. 9 and 10 I show a further modification of my invention. In this further modification only a pair of chains 110 is employed. These chains pass over sprockets 111 and 112. The chains have rollers 113 arranged at evenly spaced intervals thereon. Plates 113', secured to guide plates 14'', guide the chains 110. The rollers 113 correspond in function to the rollers 28 previously described. Coaxial with each of the rollers 113 and at the ends thereof, I mount arms 114. These arms 114 at their free ends support rollers 115 which are movable between the rollers 113.

In order to move the arms 114 and their rollers 115, I provide guide plates 116. The plates 116 are secured to the supporting plates 14''. The plates 117 engage the arms 114 and move the arms and the rollers carried by the arms from the position shown at the right in Fig. 9 to the position shown at the left in this figure so that the sizing operation is performed by the movement of the arms 114 and the rollers 115 relative to the rollers 113. The upper reach of the chain 110 is shown as inclined while the member 116 is shown as horizontal so that there is a slight angle between the upper reach of the chain and the surface which actuates the arms 114.

After the links carrying the arms 114 have passed onto the sprocket 112, the arms 114 are moved to the position shown in the left of Fig. 9 by the curved portion 118 of the guide plates 116.

The curved part 118 terminates at 119. After passing the end 119 the arms 114 are free and the rollers 115 on the lower reach of the belt drop between the rollers 113. The arms maintain this position until they engage a curved portion 120 of the guide plate 116 at the right end of the apparatus.

The further modification includes a conveyor belt 121 which receives articles which have been sized and the apparatus also includes guide members 122, operated by shafts 123, which have gears thereon similar to those shown in Fig. 6, previously described.

Having thus described my invention, I claim:

1. In a sizing apparatus, a pair of opposed, horizontally spaced, endless, flexible members, means supporting said members to form upper and lower reaches which simultaneously move in opposite directions, transverse members mounted on the flexible members and disposed between the flexible members and evenly spaced along the flexible members, a second pair of opposed, spaced, endless flexible members, means supporting the flexible members of said second pair to form upper and lower reaches which simultaneously move in opposite directions, the upper reach of said second pair of flexible members being disposed lower than, and adjacent to, the upper reach of said first pair of flexible members, second transverse members mounted on the second pair of flexible members and disposed horizontally between the second pair of flexible members and evenly spaced along said second pair of flexible members, said second transverse members being spaced apart the same distance as are the first transverse members, the transverse members carried by the second pair of flexible members each being disposed below and intermediate the transverse members carried by the first pair of flexible members and being adapted to engage articles contacting the associated pair of transverse members, and means to drive all of the flexible members in the same direction and at the same linear speed, the upper reach of said second flexible members being inclined in the direction of advancement away from the adjacent reach of the first flexible members, whereby, as the flexible members advance, the second transverse members move away from the first transverse members during the advancement.

2. In a sizing apparatus, a pair of opposed, horizontally spaced, endless chains, means supporting said chains to form upper and lower reaches which simultaneously move in opposite directions, rollers mounted on the chains and disposed horizontally between the chains and evenly spaced along the chains, a second pair of opposed, horizontally spaced, endless chains disposed within and encircled by the first pair of chains, means supporting the chains of said second pair to form upper and lower reaches which simultaneously move in opposite directions, second rollers mounted on the second pair of chains and disposed horizontally between the second pair of chains and evenly spaced along said second pair of chains, said second rollers being spaced apart the same distance as are the first rollers, the rollers carried by the second pair of chains being disposed intermediate the rollers carried by the first pair of chains, and means to drive all of said chains in the same direction and at the same linear speed, the upper reach of said second chains being inclined, in the direction of advancement away from the adjacent reach of the first chains, whereby as, the chains advance, the second rollers move away from the first rollers during the advancement.

3. In a sizing apparatus, a pair of opposed, horizontally spaced, endless chains, means supporting said chains to form upper and lower reaches which simultaneously move in opposite directions, rollers mounted on the chains and disposed horizontally between the chains and evenly spaced along the chains, a second pair of opposed, spaced, endless chains, means supporting the chains of said second pair to form upper and lower reaches which simultaneously move in opposite directions, the upper reach of said second pair of chains being disposed lower than the upper reach of said first pair of chains, second rollers mounted on the second pair of chains and disposed horizontally between the second pair of chains and evenly spaced along said second pair of chains, said second rollers being spaced apart the same distance as are the first rollers, the rollers carried by the second pair of chains each being disposed below and intermediate a pair of rollers carried by the first pair of chains and being adapted to engage articles contacting the associated pair of rollers, and means to drive all of the chains in the same direction and at the same linear speed, the upper reach of said second chains being inclined in the direction of advancement away from the adjacent reach of the first chains, whereby, as the chains advance, the second rollers move away from the first rollers during the advancement.

4. In a sizing apparatus, a support, a pair of horizontally disposed shafts on said support, a pair of spaced sprockets on each shaft, a pair of opposed, horizontally spaced, endless chains engaging said sprockets to form upper and lower reaches which simultaneously move in opposite directions, opposed pivot pins mounted on the chains, rollers mounted on said pivot pins and disposed horizontally between the chains and evenly spaced along the chains, a second pair of shafts disposed intermediate the first two shafts, spaced sprockets on each of the said intermediate shafts, a second pair of opposed, horizontally spaced endless chains engaging said last mentioned sprockets and disposed within and encircled by the first pair of chains, said last mentioned sprockets supporting the chains of said second pair to form upper and lower reaches which simultaneously move in opposite directions, pivot pins carried by opposed links of said second chains, second rollers mounted on said last mentioned pivot pins, said second rollers being disposed horizontally between, and evenly spaced along, said second pair of chains, said second rollers being spaced apart the same distance as are the first rollers, the rollers carried by the second pair of chains each being disposed below and intermediate a pair of rollers carried by the first pair of chains and being adapted to engage articles contacting the associated pair of rollers, and means to drive all of said chains in the same direction and at the same linear speed, the upper reach of said second chains being inclined in the direction of advancement away from the adjacent reach of the first chains, whereby, as the chains advance, the second rollers move away from the first rollers during the advancement.

5. In a sizing apparatus, a support, a pair of horizontally disposed shafts on said support, a pair of spaced sprockets on each shaft, a pair of opposed, horizontally spaced, endless chains engaging said sprockets to form upper and lower reaches which simultaneously move in opposite directions, opposed pivot pins mounted on the chains, rollers mounted on said pivot pins and disposed horizontally between the chains and evenly spaced along the chains, a second pair of shafts disposed intermediate the first two shafts, spaced sprockets on each of the said intermediate shafts, a second pair of opposed, horizontally spaced endless chains engaging said last mentioned sprockets and disposed within and encircled by the first pair of chains, said last mentioned sprockets supporting the chains of said second pair to form upper and lower reaches which simultaneously move in opposite directions, outwardly directed support arms carried by opposed links of said second chains, pivot pins carried by said upwardly directed support arms, second rollers mounted on said last mentioned pivot pins, said second rollers being disposed horizontally between, and evenly spaced along, said second pair of chains, said second rollers being spaced apart the same distance as are the first rollers, the rollers carried by the second pair of chains each being disposed below and intermediate a pair of rollers carried by the first pair of chains and being adapted to engage articles contacting the associated pair of rollers, and means to drive all of said chains in the same direction and at the same linear speed, the upper reach of said second chains being inclined in the direction of advancement away from the adjacent reach of the first chains, whereby, as the chains advance, the second rollers move away from the first rollers during the advancement.

6. In a sizing apparatus, a support, a pair of horizontally disposed shafts on said support, a pair of spaced sprockets on each shaft, a pair of opposed, horizontally spaced, endless chains engaging said sprockets to form upper and lower reaches which simultaneously move in opposite directions, opposed guides on said support, the upper reaches of said chains slidably engaging said guides, opposed pivot pins mounted on the chains, rollers mounted on said pivot pins and disposed horizontally between the chains and evenly spaced along the chains, a second pair of shafts disposed intermediate the first two shafts, spaced sprockets on each of the said intermediate shafts, a second pair of opposed, horizontally spaced endless chains engaging said last mentioned sprockets and disposed within and encircled by the first pair of chains, said last mentioned sprockets supporting the chains of said second pair to form upper and lower reaches which simultaneously move in opposite directions, guides on said support slidably receiving the upper reaches of said second mentioned chains, outwardly directed support arms carried by opposed links of said second chains, pivot pins carried by said upwardly directed support arms, second rollers mounted on said last mentioned pivot pins, said second rollers being disposed horizontally between, and evenly spaced along said second pair of chains, said second rollers being spaced apart the same distance as are the first rollers, the rollers carried by the second pair of chains each being disposed below and intermediate a pair of rollers carried by the first pair of chains and being adapted to engage articles contacting the associated pair of rollers, and means to drive all of said chains in the same direction and at the same linear speed, the upper reach of said second chains being inclined in the direction of advancement away from the adjacent reach of the first chains, whereby, as the chains advance, the second rollers move away from the first rollers during the advancement.

FRANK B. ROBERTS.

References Cited in the file of this patent

UNITED STATES PATENTS

| Number | Name | Date |
|---|---|---|
| 1,159,460 | Wright et al. | Nov. 9, 1915 |
| 1,242,034 | Pearson | Oct. 2, 1917 |
| 1,297,486 | Murray | Mar. 18, 1919 |
| 1,332,305 | Ross | Mar. 2, 1920 |
| 1,385,218 | McIntyre | July 19, 1921 |
| 1,429,764 | O'Quinn | Sept. 19, 1922 |
| 1,489,585 | Tinklepaugh | Apr. 8, 1924 |
| 2,353,941 | Stebler | July 18, 1944 |
| 2,467,651 | Balduf | Apr. 19, 1949 |